Jan. 24, 1956     C. W. MacMILLAN ET AL     2,732,233
TOE CHANGE CORRECTIVE DEVICE
Filed Oct. 6, 1954     2 Sheets-Sheet 2
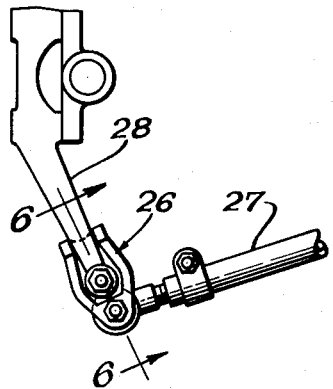
Fig. 5.
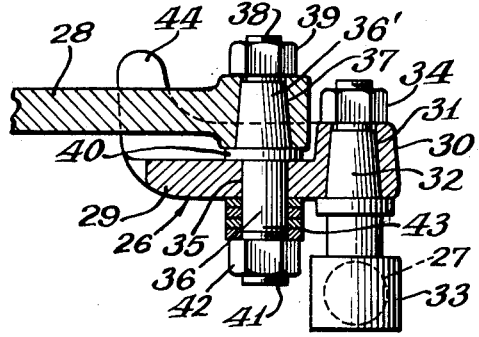
Fig. 6.
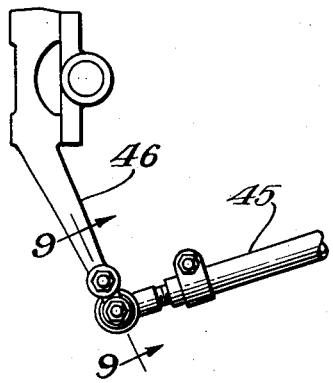
Fig. 8.
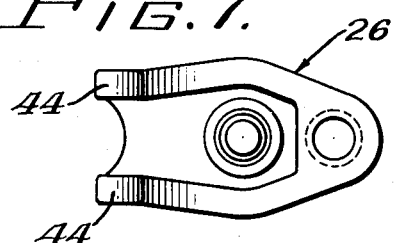
Fig. 7.
Fig. 9.
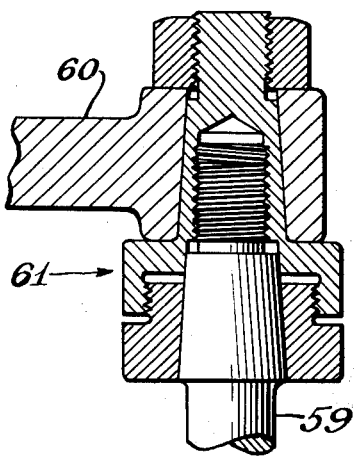
Fig. 10.
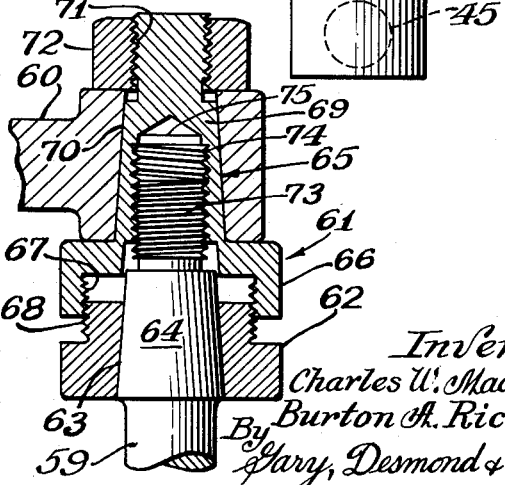
Fig. 11.
Inventors:
Charles W. MacMillan
Burton A. Richards
By Gary, Desmond & Parker
Attys.

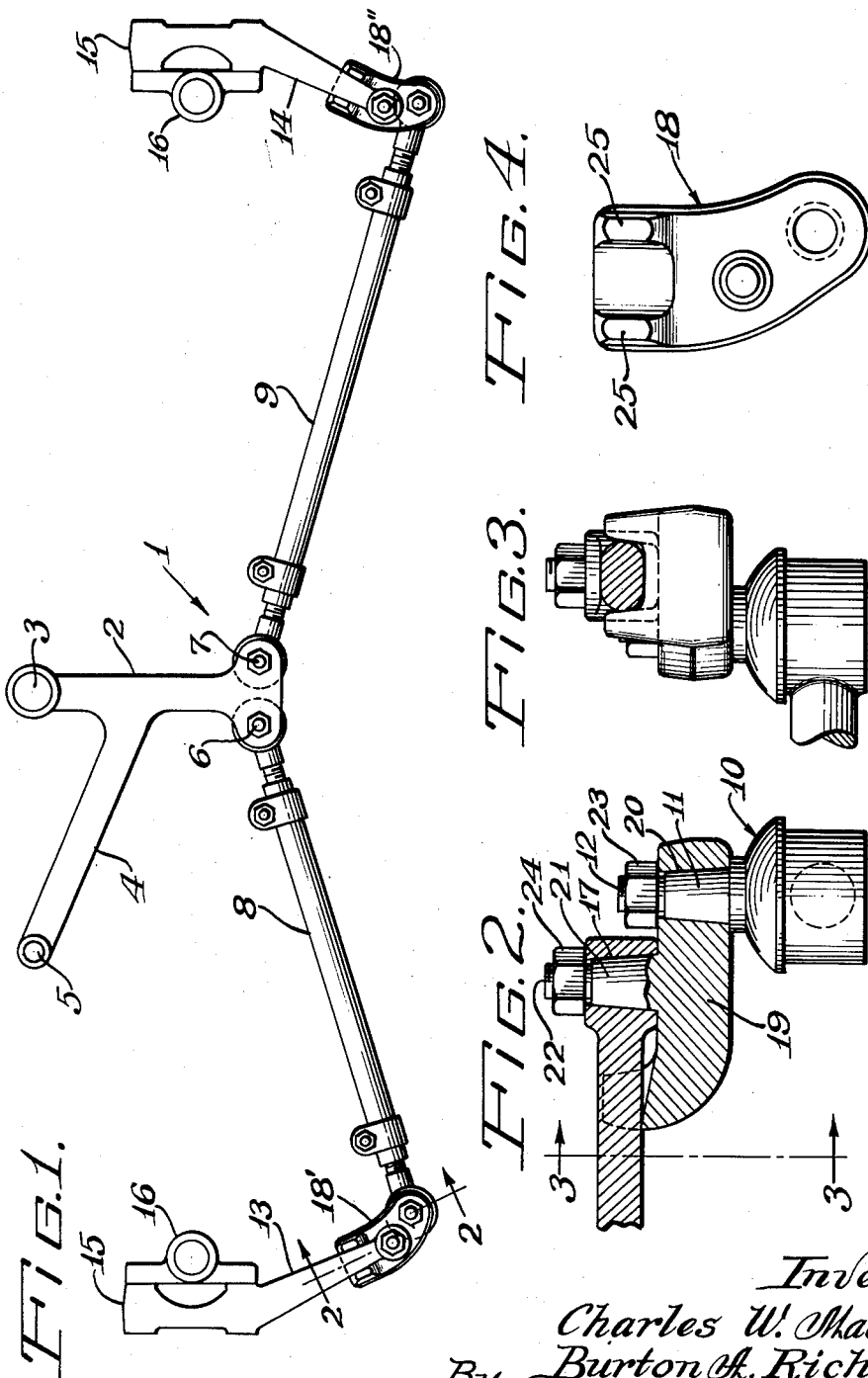

United States Patent Office 2,732,233
Patented Jan. 24, 1956

2,732,233

TOE CHANGE CORRECTIVE DEVICE

Charles W. MacMillan and Burton A. Richards, Rock Island, Ill., assignors to Bear Manufacturing Company, Rock Island, Ill., a corporation of Delaware Application October 6, 1954, Serial No. 460,603

3 Claims. (Cl. 287—54)

This invention relates to improvements in a device for correcting maladjustments of "toe" and turning radius of automotive steering apparatus.

As is well known in the art, the opposite front wheels of an automotive vehicle have their front edges closer together than are their rear edges. This aspect of the geometry of steering apparatus is known as "toe" or "toe in." With proper correlation of the elements of the steering assembly, principally the steering arms and tie rods, the desired toe adjustment remains substantially constant regardless of the load carried by the vehicle. However, with improper adjustment of the steering elements mentioned, the toe or toe in will change between no load and full load condition. This is primarily due to the fact that the camber of the front wheels change with a change in load conditions and such camber change changes the toe of an improperly adjusted mechanism.

Assuming a properly designed steering mechanism, and this desirable condition is not always met with in practice, the toe will not change appreciably with change in load. However, in use the vehicle wheels are frequently subjected to impacts and forces which frequently change the relationship between the elements of the steering apparatus. Heretofore, in order to correct such maladjustment it has been necessary to bend the steering arm or steering arms of the assembly. The steering arm is the arm which connects the wheel spindle, that is, the spindle about which the wheel rotates, to the tie rod. The steering arm, because of the task it is intended to perform is of relatively heavy construction and is extremely difficult to bend. Moreover, the location of the steering arm is such that it is worked upon most disadvantageously. Hence, the correction of toe has heretofore been a most difficult and laborious task.

The present invention contemplates a device which may be conveniently interposed between the steering arm and tie rod and which will eliminate the necessity of bending the steering arm to adjust the toe of a maladjusted steering mechanism.

As is also well known in the art, the opposite front wheels of a vehicle when steering occurs simultaneously move through different angles to accommodate themselves to movement over greater and smaller arcuate paths. This relationship, commonly known as turning radius, is also a function of the steering arms and tie rods of the steering apparatus and their geometric relationship to one another. With maladjusted turning radius, it has heretofore been the practice to bend the steering arm or arms to obtain the proper relationship of the parts.

When bending the steering arms for toe adjustment, the arms are bent upwardly or downwardly as occasion demands and in bending the arms for turning radius adjustment the arms are bent inwardly or outwardly. For either adjustment, however, the inconvenient, laborious task of bending the steering arms, hereinbefore described, must be undertaken to make the corrections.

As a further feature of the present invention the device for making the toe correction may also be employed to make turning radius corrections, if desired.

Other objects and advantages of the present invention will be apparent from the accompanying drawings and following detailed description.

In the drawings,

Fig. 1 shows a top plan view of a portion of an automobile steering apparatus illustrating an embodiment of the invention for correcting toe and turning radius.

Fig. 2 is an enlarged detailed sectional view taken on line 2—2 of Fig. 1.

Fig. 3 is a sectional view taken on line 3—3 of Fig. 2.

Fig. 4 is a top plan view of the corrective device comprising the present invention.

Fig. 5 is a fragmentary top plan view of a modification of the present invention applied to the steering arm-tie rod assembly.

Fig. 6 is an enlarged sectional view taken on line 6—6 of Fig. 5.

Fig. 7 is a top plan view of the corrective device shown in Figs. 5 and 6.

Fig. 8 is a view similar to Fig. 5 showing another modification of the invention.

Fig. 9 is an enlarged sectional view taken on line 9—9 of Fig. 8.

Fig. 10 is a sectional view of a further modification of the invention.

Fig. 11 is a view similar to Fig. 10 illustrating the parts in a different adjusted relationship to each other.

Referring in detail to the drawings, 1 indicates a portion of the steering mechanism of an automotive vehicle. The steering assembly illustrated comprises a member 2 which is pivoted at one end, as at 3 to a portion of the chassis of the vehicle. An arm 4 is rigidly connected to the member 2 and is adapted to be pivotally connected at one end, as at 5, to the knuckle arm of the steering mechanism whereby manipulation of the steering wheel swings the member 2 about its pivotal connection 3.

The opposite end of the member 2 is pivotally connected as at 6 and 7 to adjacent ends of tie rods 8 and 9 respectively. The opposite ends of each of the tie rods carries a ball and socket joint 10, each of which, in turn, carries a tapered pin 11 which is provided with threads 12 at its end.

The vehicle with which the steering mechanism 1 is associated, has opposite steering arms 13 and 14 respectively and each of the arms is connected to a spindle block 15. Each of the spindle blocks 15 carries a spindle (not shown) upon which the front wheels of the automobile rotate. Each of the spindle blocks also carries a sleeve 16 which is adapted to rotatably engage the kingpins (not shown) at each side of the vehicle, the kingpins, of course, being carried by the front spring suspension system.

Each of the steering arms 13 and 14 is provided with a tapered aperture 17 adjacent its end which, in conventional constructions, engages with the tapered pins 11 carried by the tie rods 8 and 9. Thus, when the member 2 is rocked about pivot 3 the arms 13 and 14 are swung about the kingpins associated with the sleeves 16 and in this fashion steering of the vehicle is accomplished.

As is well known in the art the front wheels of the vehicle are toed inwardly, that is, the front edges of the front wheels are closer together than the rear edges thereof. The relationship of the wheels is essentially controlled by the geometrical relationship of the tie rods and the steering arms in such fashion that when the member 2 is in substantial axial alignment with the longitudinal axis of the vehicle the opposite wheels will be toed inwardly with respect to each other. As has been hereinbefore described, when through faulty design or through injury to the elements of the steering mechanism the geometrical relationship of the parts is improper, changes in the loading conditions of the vehicle will tend to change the toed in relationship of the front wheels of the vehicle, that is, at various loads the wheels will be toed in different degrees.

When such a condition occurs, it has heretofore been the practice to adjust this aspect of the steering mechanism by bending the steering arms 13 and/or 14 upwardly or downwardly. In so bending the steering arms the point of connection of the steering arms with respect to the tie rods is changed horizontally with respect to the points of connection of said tie rods with the member 2. By appropriately bending the steering arms 13 and 14 a position may be reached at which variations in load carried by the vehicle will have substantially no effect upon the toed relationship of the front wheels. As has also been hereinbefore described, because of the task intended to be performed by the steering arms 13 and 14 said arms are relatively heavy and of strong construction and are extremely difficult to bend in the cold state. Moreover said arms are in a relatively inaccessible position and hence making an adjustment for proper toe is an inconvenient and laborious task. In the present invention, a device indicated generally at 18 may be employed to properly relate each steering arm to its associated tie rod. The device 18 comprises a body portion 19 which at one end is provided with a tapered aperture 20. At the top of the device, and intermediate its length a tapered pin 21 extends upwardly, said pin being provided with threads 22 at its upper end. In utilizing the device 18 the pin 11 carried by the ball and socket joint 10 is adapted to be positioned in the aperture 20 and said pin is securely fastened therein by means of nut 23. The pin 21 is adapted to engage in the tapered aperture 17 provided at the end of the steering arm and said pin is securely fastened therein by means of nut 24. In order to prevent rotary motion of pin 21 with respect to pin 11 the device 18 carries upstanding spaced lugs 25 which, when the device 18 is in operative position, engage opposite sides of the steering arm 13 and prevents rotary motion of said device relative to said arm.

It can readily be seen that employing a device 18 of a desired body thickness 19, the end of the tie rod 8 or 9 may be disposed a desired distance below the plane of the end of the steering arm with which the tie rod is associated. This relationship, in effect, has the same effect as bending the steering arm downwardly and thus the relationship between the tie rod and the steering arm may be appropriately changed in such fashion as to prevent toe change upon variations in loading conditions of the vehicle.

The device 18 is particularly adaptable to correct an error in the design of the vehicle. Such an error in design persists throughout a large number of vehicles placed upon the market and consequently it is merely necessary for a repair shop to stock substantially one type of device 18 to be employed in correcting the improperly designed steering mechanism.

It frequently happens that when design errors occur in the toe in relationship of the wheels, the turning radius relationship of the wheels is also in error. Consequently, as a feature of the invention the aperture 20 and pin 21 of the device 18 may be laterally offset with respect to each other. For example, the device 18 may be constructed in right and left hand pairs and in order to correct a predetermined error in turning radius, such a pair of devices may be employed, as illustrated in Fig. 1 wherein the device 18' is turned inwardly with respect to the center line of the vehicle and the device 18" is turned outwardly. Of course, the opposite relationship of the devices may be employed, that is, both devices may be turned inwardly or both devices may be turned outwardly, or the device associated with the left hand wheel may be turned inwardly and the device associated with the right hand wheel may be turned outwardly as illustrated in Fig. 1 or the device associated with the left hand wheel may be turned outwardly and the device associated with the right hand wheel may be turned inwardly. It will be noted that the effect of offsetting the aperture 20 with respect to the pin 21 is the same as bending the steering arms 13 and 14 laterally in one direction or the other. Simultaneously, the horizontal offset relationship of pin 11 with respect to pin 21 has the effect of bending the steering arms in a vertical direction. Thus, the device 18 may be utilizable to cure a large variety of maladjustments in the steering mechanism of the vehicle which may be due to improper design of the steering mechanism or which may be due to injury to the steering mechanism. The corrective device 18 merely requires the manipulation of nuts 23 and 24 to interpose the device between the ends of the tie rods and the ends of the steering arms and no bending of the steering arms is required.

Referring particularly to Figs. 5, 6 and 7, a modification of the invention is shown. In this form of the invention a device 26 is adapted to be interposed between a tie rod 27 and steering arm 28. The device 26 comprises a body portion 29 which at one end carries a boss 30, the latter being provided with a tapered aperture 31 for the reception of tapered pin 32 carried by a ball-and-socket joint 33, which, in turn is carried at the end of tie rod 27. The upper end of pin 32 is provided with threads whereby nut 34 engageable with said threads functions to seat firmly the pin 32 in the aperture 31.

Spaced from boss 30, the body 29 is provided with an aperture 35 adapted for the reception of a bolt 36. The upper portion of said bolt has a tapered outer surface 36' which is engageable with tapered aperture 37 provided in the end of steering arm 28. The end of bolt 36 carries threads, as at 38, whereby nut 39 functions to seat securely the tapered portion 36' of bolt 36 in the aperture 37. Below the tapered surface 36', the bolt is provided with an annular rib 40 which is adapted to seat upon the upper face of the body 29. The bottom end portion of the bolt 36 carries threads 41 with which a nut 42 engages, the nut 42 being spaced from the bottom of the body 29 by a plurality of washers 43 which embrace the shank of the bolt.

In utilizing the device 26 for toe correction, depending upon the degree of correction necessary, the device may be secured to the tie rod 27 and steering arm, as described, with the annular rib 40 in direct contact with the upper face of the body 29, as shown, or one or more of the washers 48 may be removed from between nut 42 and body 29 and inserted between the rib 40 and the upper face of the body 29. In this fashion, the plane of tie rod 27 and steering arm 28 may be changed which has the effect of bending arm 28 as has been heretofore resorted to, to correct the toe-in of the wheels.

The upper portion of the body 29 may carry spaced lugs 44 which engage opposite sides of the steering arm 44 and prevent relative rotation of arm 28 and the device 26.

Referring particularly to Figs. 8 and 9 another modification of the invention is shown wherein a conventional tie-rod 45 is associated with a conventional steering arm 46 through the medium of a device 47. The device 47 carries at one end a boss 48 which is provided with a tapered aperture 49 adapted for engagement with a tapered pin 50 which extends from a conventional ball-and-socket joint 51, the element 51 being carried at the end of the tie rod 45. The upper end portion of the pin 50 is provided with threads 52 with which a nut 53 is engageable to securely fasten the pin within the aperture. The device 47 also comprises an offset connecting portion 54 which terminates in a tapered pin 55. The pin 55 is adapted to register with tapered aperture 56 provided at the end of the steering arm 46. The upper end of the pin 55 carries screw threads 57 which are engageable with nut 58 whereby the pin 55 may be securely seated within the tapered aperture 56. This form of the present invention is exceedingly simple. It can readily be seen that when the device 47 is employed, the pin 50 which would normally engage in the aperture 56 is disposed below the plane of the arm 46, that is, the tie rod 45 is lowered with respect to the steering arm 46. This has the effect of bending the steering arm 46, the practice which has heretofore been resorted to to correct mal-adjustments of toe.

The device 47 in addition to being suitable for correcting mal-adjustments of toe, can also be employed to change turning radius since pin 55 may be rotated within the aperture 56 before the nut 58 is drawn into clamping position. Hence, the device 47 at either end of the tie rods 45 may be swung a predetermined distance relative to the adjacent steering arms to compensate for errors in turning radius. It has been found that the arrangement comprising the tapered apertures and tapered pins, when the nuts are drawn tight, provides a substantially permanent adjustment.

Referring particularly to Figs. 10 and 11 a further modification of the present invention is shown. In these figures, the reference numeral 59 indicates the pin which is carried by the usual ball-and-socket joint which, in turn, is carried at the end of the tie rod. The reference numeral 60 indicates the end of a conventional steering arm which normally is connected to the tie rod which carries the pin 59. In this form of the invention a device 61 functions to adjustably connect the tie rod to the steering arm and comprises a collar 62 which is provided with a tapered aperture 63, the aperture being adapted to receive the tapered portion 64 of pin 59. The device 61 also comprises an upper pin member 65. The lower portion of the member 65 is of relatively large diameter as shown at 66, the internal portion thereof carrying screw threads 67. The upper portion of the member 62 is also provided with screw threads 68 which are adapted to engage the threads 67 carried by the member 65. An intermediate portion of the member 65 is conically tapered, as shown best at 69, said tapered portion being adapted for engagement in a tapered aperture 70 provided at the end of the steering arm 60. The upper end of the member 65 carries screw threads 71 with which a nut 72 engages whereby the tapered portion 69 of the member 65 is firmly seated within the aperture 70.

The upper end portion of the pin 59 carries screw threads 73 which are adapted to engage with registering threads 74 carried upon the inner surface of an aperture 75 provided within the tapered portion 69 of the member 65.

The arrangement is such that the plane of the tie rod which carries the pin 59 can be adjustably disposed beneath the plane of the steering arm 60. In Fig. 10 it will be noted that the member 65 is seated upon the collar 62 in such manner as to shorten the distance between the tie rod and the steering arm. This adjustment is accomplished by threading the member 65 further downwardly upon the member 62 and by correspondingly threading the member 65 further downwardly upon the pin 59 through the respective engagement of threads 67 and 68 and the threads 73 and 74. In Fig. 11, the parts are so arranged that the plane of the tie rod is separated a greater distance from the plane of the steering arm than the arrangement shown in Fig. 10. In either position the parts may be locked by the nut 72.

It can readily be seen that by the arrangement shown in Figs. 10 and 11, the position of the end of the tie rod may be adjustably changed with respect to the steering arm and hence has the effect of bending the steering arm, the practice which has heretofore been resorted to in making toe corrections.

We claim as our invention:

1. A device for correcting toe of the steering mechanism of an automotive vehicle which comprises, a body member having two offset portions, one of said offset portions being provided with a tapered aperture for the reception of a tie rod connecting pin, and the other offset portion comprising a tapered pin for engagement with a tapered hole provided in a steering arm, said tapered aperture being offset with respect to said tapered pin in planes at right-angles to the axes of said tapered pin and tapered aperture, and a pair of spaced lugs carried upon said body adjacent said tapered pin for engagement with opposite sides of said steering arm to prevent rotation of said body with respect to said steering arm.

2. A device for correcting toe of the steering mechanism of an automotive vehicle which comprises, a body, one end portion of said body being provided with a tapered aperture for the reception of a tie rod connecting pin, a pin having a tapered portion carried upon said body in spaced relationship to said aperture for engagement with a tapered hole provided in a steering arm, the axes of said aperture and said pin being parallel and the tapered portion of said pin and said aperture being offset in planes at right angles to their axes, and a pair of spaced lugs carried upon said body adjacent said tapered portion of said pin for engagement with opposite sides of said steering arm to prevent rotation of said body with respect to said steering arm.

3. A device as contemplated in claim 2 including means for changeably positioning said pin axially upon said body.

References Cited in the file of this patent

UNITED STATES PATENTS

| | | |
|---|---|---|
| 1,734,194 | Bierd et al. | Nov. 5, 1929 |
| 1,766,926 | Moorhouse | June 24, 1930 |
| 1,768,347 | Trumble | June 24, 1930 |
| 2,153,271 | Paton | Apr. 4, 1939 |
| 2,383,378 | Flumerfelt | Aug. 21, 1945 |
| 2,588,544 | Langer | Mar. 11, 1952 |
| 2,614,862 | Alldredge | Oct. 21, 1952 |